United States Patent
Roschke et al.

(10) Patent No.: US 8,100,381 B2
(45) Date of Patent: Jan. 24, 2012

(54) GAS REGULATING AND SAFETY VALVE FOR BURNERS OF A MODULATABLE GAS HEATING DEVICE

(75) Inventors: Thomas Roschke, Arnsdorf (DE); Jörg Köhler, Dresden (DE); Michel Gamot, Arzon (FR)

(73) Assignee: Saia-Burgess Dresden GmbH, Dresden (DE)

( * ) Notice: Subject to any disclaimer, the term of this patent is extended or adjusted under 35 U.S.C. 154(b) by 342 days.

(21) Appl. No.: 12/162,704

(22) PCT Filed: Aug. 7, 2007

(86) PCT No.: PCT/DE2007/001406
§ 371 (c)(1),
(2), (4) Date: Oct. 10, 2008

(87) PCT Pub. No.: WO2008/025321
PCT Pub. Date: Mar. 6, 2008

(65) Prior Publication Data
US 2009/0223572 A1    Sep. 10, 2009

(30) Foreign Application Priority Data
Aug. 31, 2006 (DE) .......................... 10 2006 041 872

(51) Int. Cl.
*F16K 31/06* (2006.01)
(52) U.S. Cl. ........... 251/129.11; 251/129.1; 251/129.22; 137/613
(58) Field of Classification Search .................. 137/613; 251/129.1, 129.11, 129.12, 129.13, 129.22
See application file for complete search history.

(56) References Cited

U.S. PATENT DOCUMENTS
741,267 A    10/1903   Neubling
(Continued)

FOREIGN PATENT DOCUMENTS
DE    85 15 891 U1    7/1985
(Continued)

OTHER PUBLICATIONS
International Search Report mailed Dec. 13, 2007.

*Primary Examiner* — John Fristoe, Jr.
*Assistant Examiner* — William McCalister
(74) *Attorney, Agent, or Firm* — Norris McLaughlin & Marcus, PA; Christa Hildebrand, Esq.

(57) ABSTRACT

The invention relates to an integrated gas regulating and safety valve for burners of a modulatable gas heating device. According to the invention, the gas regulating and safety valve comprises a housing (1) with two controllable closing elements, the axes of which are spaced apart from each other and extend one behind the other in series in the direction of gas flow between an inlet channel (2) and an outlet channel (4) of the housing. In the de-energized state, the two closing elements abruptly close the gas regulating and safety valve independently of each other, in each case by means of an associated spring element (7, 12). The first closing element, additionally serving for the modulation of the gas stream, has a drive spindle (15.1), which is formed as a spindle of a stepping motor (15), is surrounded by an excitation winding (16) and has placed on its end a restrictor component (8) and, at a distance from that, the first spring element (7). The second closing element, on the other hand, has a closure component (8) connected to an armature (9), wherein the armature (9) is arranged in a cylindrical cavity (18) and operates against the force of the second spring element (12) acting on the armature (9). This cavity (18) is surrounded by an excitation winding (17) of the armature (9) that is formed as part of an electromagnet.

8 Claims, 3 Drawing Sheets

U.S. PATENT DOCUMENTS

| | | | |
|---|---|---|---|
| 1,518,894 A * | 12/1924 | Bliss | 236/84 |
| 2,371,351 A | 3/1945 | Paille | |
| 2,910,249 A * | 10/1959 | Gunkel | 239/548 |
| 2,922,614 A * | 1/1960 | Nickells | 251/54 |
| 3,355,140 A * | 11/1967 | Andersen | 251/65 |
| 3,750,693 A * | 8/1973 | Hardison | 137/219 |
| 4,033,513 A * | 7/1977 | Long | 239/585.3 |
| 4,197,873 A * | 4/1980 | Minogue et al. | 137/219 |
| 4,223,692 A * | 9/1980 | Perry | 137/78.4 |
| 4,402,344 A * | 9/1983 | Kemmner | 137/625.33 |
| 4,557,185 A * | 12/1985 | Harriman | 454/348 |
| 4,643,394 A | 2/1987 | Shimura et al. | |
| 4,925,155 A * | 5/1990 | Carman | 251/117 |
| 5,069,189 A * | 12/1991 | Saito | 123/533 |
| 5,199,459 A * | 4/1993 | Mullally | 137/613 |
| 6,076,803 A * | 6/2000 | Johnson et al. | 251/129.22 |
| 6,302,341 B1 * | 10/2001 | Yoo | 239/585.1 |
| 6,572,077 B1 | 6/2003 | Wörner | |
| 6,814,339 B2 | 11/2004 | Berger et al. | |
| 6,848,474 B2 | 2/2005 | Sollier | |
| 7,111,642 B2 | 9/2006 | Takeda | |
| 2002/0029812 A1 * | 3/2002 | Hotta et al. | 137/613 |
| 2004/0069355 A1 | 4/2004 | Sollier | |
| 2004/0149945 A1 | 8/2004 | Berger et al. | |
| 2005/0022884 A1 | 2/2005 | Takeda | |

FOREIGN PATENT DOCUMENTS

| | | |
|---|---|---|
| DE | 42 06 875 A1 | 9/1993 |
| DE | 19525384 C2 | 1/1997 |
| DE | 196 54 417 A1 | 6/1998 |
| DE | 198 26 076 C1 | 8/1999 |
| DE | 101 14 175 C1 | 8/2002 |
| DE | 101 35 115 A1 | 2/2003 |
| DE | 103 18 569 B3 | 5/2004 |
| DE | 103 61 918 A1 | 10/2005 |
| EP | 0 757 200 A2 | 2/1997 |
| EP | 0 881 435 A | 12/1998 |
| EP | 1 106 922 A | 6/2001 |
| EP | 1482224 A1 * | 12/2004 |
| EP | 1 503 122 A | 2/2005 |
| FR | 2 821 915 A | 9/2002 |
| JP | 61 034778 A | 2/1986 |

* cited by examiner

GAS REGULATING AND SAFETY VALVE FOR BURNERS OF A MODULATABLE GAS HEATING DEVICE

This is an application filed under 35 USC §371 of PCT/DE2007/001406 and claiming priority under DE 10 2006 041 872.7 filed on Aug. 31, 2006.

BACKGROUND OF THE INVENTION

The invention relates to an integrated gas control and safety valve for a burner of a modulatable gas heating device which is configured to adapt to a changeable thermal load and to abruptly turn off the gas flow, in particular for heating living areas and for gas heaters that supply hot water.

Gas control and safety valves of this type typically include two electrically controllable actuator units, namely a rapidly closing valve and a modulation valve. The two independently operating actuator units are operated by electromagnets and are closed in the de-energized state by return springs. For modulating the gas flow, the modulation valve is additionally fine-adjusted by a proportional magnet or a stepper motor, so that two rapid closure functions and a modulating function can be realized with two actuator units.

DE 103 18 569 B3 discloses a gas control and safety valve for burners of a modulatable gas heating device with two closure elements positioned in a housing in coaxial arrangement between an inlet channel and an outlet channel. The first, outer closure element include a drive axle, a throttle element arranged on the lower end of the drive axle, and a pre-biased spring element operating on the first closure element and arranged in the upper region of the drive axle. The second, inner closure element arranged between the first spring element and the throttle element has a sealing element connected with a hollow armature, wherein the sealing element seats on a valve seat for closing an annular gap connected with the outlet channel. The hollow armature is movable in a cylindrical cavity surrounded by the drive winding of the hollow armature and arranged so as to operate against the force of a second pre-biased spring element.

DE 101 14 175 C1 describes a coaxial magnetic valve, wherein the magnetic drive has two independent, axially superpositioned magnetic circuits, each including a coil, which cooperate with the two superpositioned armatures, wherein one of the armatures is connected with the inner valve disk and the other armature is connected with the outer valve disk, wherein the armature of the outer valve disk is penetrated by a push rod connecting the inner valve disk with its armature.

DE 198 26 076 C1 describes an invention with a dual safety valve. The first (outer) valve disk in the flow direction of the dual safety valve surrounds the second (inner) valve disk, so that both valve seats are combined into a common valve seat and this valve seat surrounds the only valve opening. This dual safety valve also includes a coil which operates on an armature connected with the inner valve disk. The outer valve disk engages behind the inner valve disk in the closing direction and is hence carried along by the inner valve disk, when the inner valve disk opens. This invention has the disadvantage that both valve disks can only be opened together, thereby preventing the two actuators from operating independently.

DE 195 25 384 C2 and the almost identical EP 0 757 200 B1 disclose a dual safety magnetic valve with two actuators. The two actuators are arranged on a common axis, preferably one on top of the other, wherein the first actuator has as a magnetic armature a hollow armature. The armature of the second actuator is longitudinally movable inside the hollow armature along the common axis, wherein only a single magnetic drive, in which the hollow armature as well as the armature protrude, is provided for both actuators. Although this dual safety valve already has a relatively compact design, the axial dimensions are still large because the valves disks and actuators are both movable and arranged consecutively in the axial direction.

DE 103 61 918 A1 describes a gas-tight valve drive with a motor and a safety closure function, wherein the stepper motor used for the valve drive consists of a rotating rotor with an integrated spindle-nut system for converting the rotary movement into a translational displacement and as a spindle an adjusting rod coupled with a valve cone. When the rotor rotates, the adjusting rod moves along the motor axis in the hub through an integrated looking piston in the valve body. A return spring provides a safety adjustment function. This invention is characterized in that the valve drive consists of a motor part and a valve part with a continuous adjusting rod, that the return spring is implemented as a coil spring and located on the drive side of the motor and is coupled as a first element of the valve part following the coupling element with the valve body receiving the return spring and via the coupling element with the rotor of the motor part.

Disadvantageously, due to the large number of components, conventional gas valves have large tolerance chains or interfering actuating paths which require a complicated installation and may also increase the failure rate.

Another major disadvantage of conventional gas valves is that the sealing sleeve required for external gas-tightness limits the mechanical efficiency of the actuators of the gas valves.

BRIEF SUMMARY OF THE INVENTION

It is therefore an object of the invention to propose a gas control and safety valve for burners of a modulatable gas heating device which has a simpler construction while providing two rapid closure functions and a modulation function, and wherein the two closure elements provided for this purpose are completely mechanically decoupled from one another.

According to the invention, the gas control and safety valve for a burner of a modulatable gas heating device includes at least a housing with two controllable closure elements having spaced-apart axes which extend consecutively axially in a straight line in the gas flow direction between an inlet channel and an outlet channel of the housing, wherein the first closure element operates in the direction of the inlet channel and the second closure element operates in the direction of the outlet channel. In a de-energized state, the two closure elements abruptly and independently of one another close the gas control and safety valve with the help of an associated spring element. The first closure element which is also used to modulate the gas flow includes a throttle element and spaced therefrom the first spring element. The first closure element is driven by a spindle-nut-system coupled with an electric motor having at least one field winding. Conversely, the second closure element has a closure element connected with an armature, wherein the armature is arranged in a cylindrical cavity and operates against the force of the second spring element acting on the armature. The cavity is surrounded by a field winding of the armature forming a part of an electromagnet.

The major advantage of the invention compared to the state of the art is that the two closure elements are completely mechanically decoupled from one another. In addition, greater actuating forces can be attained by eliminating a gastight sealing sleeve in the air gap of the linear drive and/or the electromagnet. By eliminating the gas-tight isolation sleeve, the current-carrying components, in particular the field winding of the electric motor implemented as a stepper motor of the first closure element and the field winding of the armature of the second closure element, are located within the gas flow. Practical experiments have shown that the gas control and safety valve of the invention is capable of operating with up to 30% greater actuating forces, which also improves operational reliability. Stated differently, the gas control and safety valve can be sized more economically while providing the same force.

In a particularly advantageous embodiment of the invention, the housing is formed in two parts with a first housing part and a second hosting part, wherein the first closure element is disposed in the first housing part and the second closure element is disposed in the second housing part. Preferably, the housing is cylindrical, whereby the inlet channel and the inlet chamber are located at a first end face, and the outlet channel is located at the other end face. To produce the gas control and safety valve, the two housing parts are typically connected so that the walls at the end faces of the two housing parts contact each other and are sealed against each other by using a sealing element.

The armature of the second closure element can be produced either as a solid armature or as a hollow armature. An armature implemented as a hollow armature is hereby arranged in the cylindrical cavity so as to operate against the force of the second spring element disposed inside the hollow armature. Conversely, when using a solid armature, the second spring element engages on the outside of the solid armature.

According to the invention, the spindle-nut system may be arranged either inside the electric motor or outside the electric motor. In the first case, the nut or the rotor, respectively, are driven by the field winding of the motor, whereby the spindle is formed as the drive axle. In the second case, the nut is driven by the motor shaft.

The spaced-apart axes of the two controllable closure elements may be arranged in the housing with any orientation; preferably, however, orthogonally as a corner valve, parallel or axially one after the other on a straight line.

When the gas control and safety valve has closure elements arranged consecutively on a straight line in the axial direction, an ondular washer is provided which is disposed on the housing wall in a sandwich structure between the opposing end faces of the two closure elements for the purpose of compensating for axial tolerances as well as for ensuring an adequate pressing force of the two closure elements.

According to the concept of the invention, the inlet chamber is arranged downstream of the inlet channel in the gas flow direction, whereby in the closed position of the gas control and safety valve the sealing surface of the throttle element seats gas-tight on a valve seat arranged at the end of the inlet chamber, and the sealing surface of the closure element seats gas-tight on a valve seat disposed at the start of the outlet channel. The throttle element is hereby configured for axial movement inside the inlet chamber between an open position and a closed position.

Both closure elements have in common that either closure element is subjected to a force from a corresponding pre-biased spring element. However, a significant difference in the function of both closure elements is that the first closure element performs a control function for adapting the gas flow to a changing thermal load, whereas the second closure element is employed solely as a safety-shutoff device. The first closure element is hereby moved by a linear drive against a spring force from its closed position into its open position. Conversely, the second closure element is held in its open position by an electromagnet.

The mutually independent functionality and operation of the two closure elements reliably prevents a complete blockage of the gas control and safety valve of the invention in the event of a catastrophic failure or malfunction.

The throttle element of the first closure element can have any form and valve characteristic suitable for modulating the gas flow required for supplying the burner of the gas heating device. Preferably, a progressive valve characteristic is selected because variable supply pressures can then be better stabilized, thus minimizing the risk that the control circuit oscillates.

The sealing element of the second closure element has now the function of a safety shutoff device when the gas control and safety valve is de-energized. When power is interrupted, the outlet channel is sealed gas-tight by the sealing element, because the second spring element disposed inside the hollow armature or of the second spring element engaging from the outside with a solid armature relaxes.

In a preferred embodiment of the invention, the valve seat and the sealing surface of the throttle element are each shaped as a ring, wherein in the open position of the throttle element an annular gap for the inflowing gas is formed between the valve seat and the throttle element.

The invention has the additional advantage in that the gas control and safety valve of the invention is constructed of a small number of components which facilitates preassembly and reduces the failure rate.

In the longitudinal gas control and safety valve, the gas flows essentially in the direction of the longitudinal axes of the housing without significant changes in direction, so that the pressure drop is relatively small in the open position of the gas control and safety valve or its closure elements. To this end, a channel for the gas flow is provided inside the housing, which extends in form of a ring about the two closure elements from the inlet channel to the outlet channel.

The significant advantages and features of the invention over the state of the art are basically:
  with the consecutive arrangement of the axes of the two closure elements in a straight line, the gas control and safety valve can attain greater actuating forces and a higher efficiency by eliminating a sealing sleeve,
  the electronics for controlling the valve can be easily integrated in the valve structure, because the connecting line between the motor and the electromagnet can be routed through a single gas-tight feedthrough arranged in the housing wall of the valve.
  lower manufacturing costs by using only a small number of components,
  complete mechanical decoupling of the two closure elements improves failsafe operation,
  both closure elements are operatively connected to a pre-biased spring element, so that both provide a rapid closure function,
  the throttle element of the first closure element additionally performs a control and/or modulation function for adapting the gas flow to the different thermal loads, and
  the drive of the first closure element is implemented as a linear drive, and the drive of the second closure element is implemented as an electromagnet.

The objects and advantages of this invention can be better understood and evaluated after careful review of the following detailed description of the preferred, but not limiting exemplary embodiments of the invention in conjunction with the drawings, which show in:

DETAILED DESCRIPTION OF THE INVENTION

Figure 1:
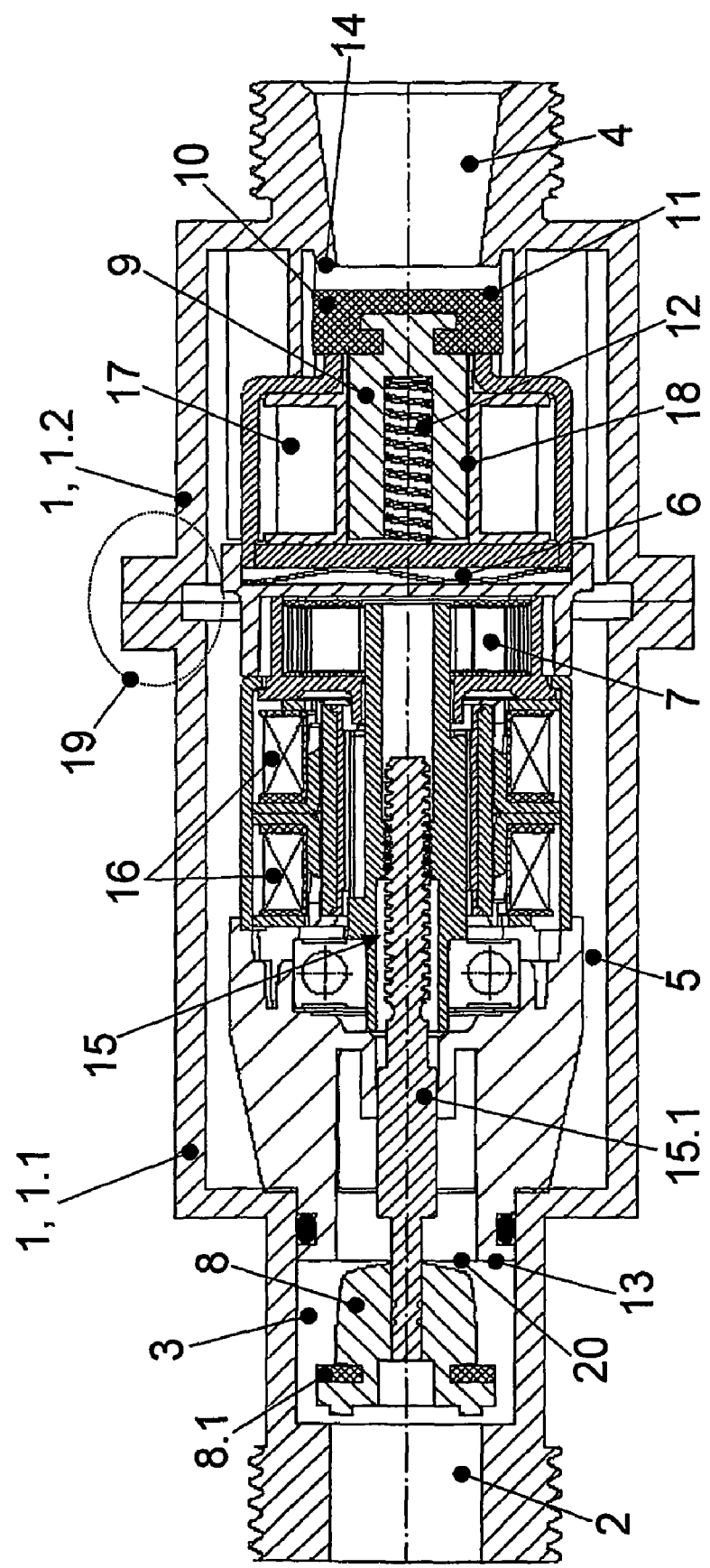
FIG. 1 a cross-sectional view of the gas control and safety valve with a spindle-nut system arranged inside the motor, with both closure elements in the open position, FIG. 2 a cross-sectional view of the gas control and safety valve with a spindle-nut system arranged inside the motor, with both closure elements in the closed position, and FIG. 3 cross-sectional view of the gas control and safety valve with a spindle-nut system arranged outside the motor, with both closure elements in the closed position.
Figure 2:
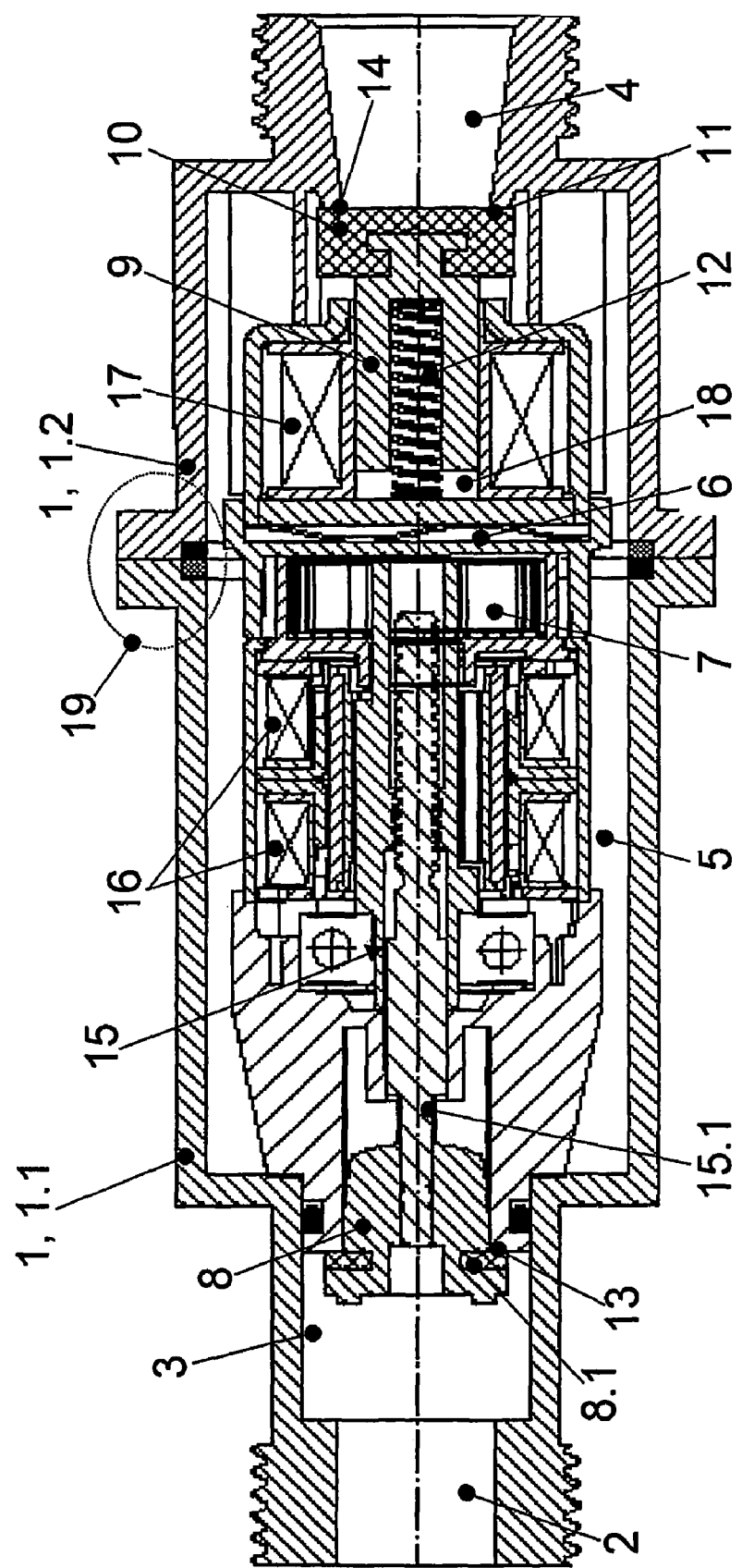

FIGS. 1 and 2 show the same gas control and safety valve of the invention with a spindle-nut system arranged inside the motor in a cross-sectional view in the closed position and in the open position, respectively. The gas control and safety valve consists of a two-part housing with a first housing part 1.1 and a second housing part 1.2. The outer surfaces of both housing parts 1.1 and 1.2 are screwed together in their coupling region and sealed. The inlet channel 2 with the inlet chamber 3 arranged downstream in the gas flow direction is disposed at the end of the first housing part 1.1. The outlet chamber is located at the end of the second housing part. The first closure element operating in the direction of the inlet channel 2 and the second closure element operating in the direction of the outlet channel represent a central component located inside the housing. The respective axes of the two closure elements are spaced from one another and extend sequentially in a straight line between the inlet channel 2 and the outlet channel 4. The electrically controllable first closure element extends here in the first housing part 1.1 starting from the coupling region 19 to the inlet chamber 3, whereas the electrically controllable second closure element extends in the second housing part 1.2 starting from the coupling region 19 to the outlet chamber 4. Inside the gas control and safety valve, the gas flows in an essentially ring-shaped channel 5 which extends from the inlet chamber 3 to the outlet channel 4, with the current-carrying components being located in the gas flow without employing a gas-tight sealing sleeve. The first closure element has a drive wile axle 15.1 implemented as a spindle of a linear drive 15, with a throttle element 8 located at one end and the first spring element 7 located at the opposing end, i.e., in the coupling region of the two housing parts 1.1, 1.2. The stepper motor further includes the windings 16 of the electric motor 15 with the rotor (not shown in detail), which is coupled to the drive axle 15.1 for translational displacement. The rotation of the rotor is converted into a translational displacement of the drive axle 15.1 inside the electric motor 15 by the spindle-nut system. Conversely, the second closure element includes a sealing element 10 connected to a hollow armature 9, wherein the hollow armature 9 is disposed in a cylindrical cavity 18 formed by a field winding 17 of the hollow armature 9 which is part of an electromagnet, and operates against the force of the second spring element 12 located inside the hollow armature 9. In the de-energized state, the two closure elements close the gas control and safety valve independently of one another with the help of the corresponding spring elements 7, 12. However, the first closure element is also used to modulate the gas flow with the linear drive. The throttle element 8 of the first closure element is configured for axial displacement in the inlet chamber 3 between an open position and a closed position. In the closed position of the gas control and safety valve of FIG. 2, the sealing surface 8.1 of the throttle element 8 seats on a valve seat 13 disposed on one end of the inlet chamber 3. In the closed position, the sealing surface 11 of the sealing element 10 seats on a valve seat 14 disposed at the start of the outlet channel 4 and closes the outlet chamber. For this purpose, the valve seat 13 and the sealing surface 8.1 of the throttle element 8 each have an annular shape. As illustrated in FIG. 1, an annular gap 20 for the inflowing gas is formed in the open position of the throttle element 8 between the valve seat 13 and throttle element 8. The throttle element 8 has preferably a conical shape. An ondular washer 6, which extends partially over the cross-section of the gas control and safety valve and is sandwiched between the two end faces of the two closure elements, is disposed in the coupling region 19 between the first housing part 1.1 and the second housing part 1.2. The ondular washer 6 thus makes partial contact with both closure elements to foremost ensure compensation of the axial tolerances of the two closure elements. In addition, the ondular washer 6 generates the required pressing forces, or the pre-bias, applied by the two closure elements on the corresponding inner wall of the housing.

Figure 3:
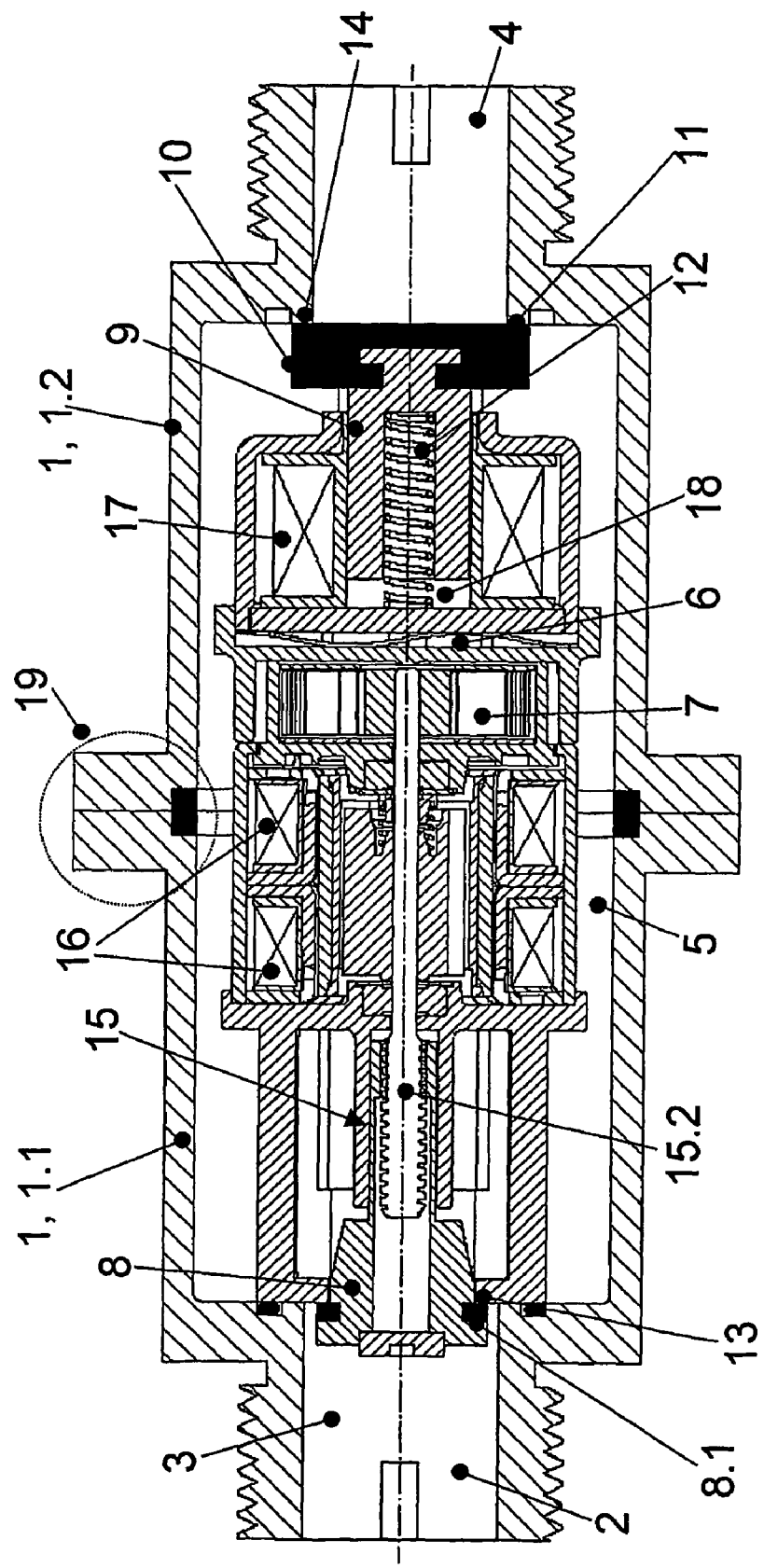

FIG. 3 shows a cross-sectional view of the gas control and safety valve with a spindle-nut system that is located outside the electric motor 15, with the two closure elements in the closed position. The same reference numerals as in FIGS. 1 and 2 have been applied. The basic configuration of the gas control and safety valve corresponds to that of FIG. 2, however with the difference that the electric motor 15 has a motor shaft 15.2 and that the spindle-nut system is positioned outside the electric motor 15. The spindle-nut system located outside the electric motor 15 converts here the rotation of the motor shaft 15.2 into a translational displacement of the throttle element 8.

The invention claimed is:

1. A gas control and safety valve for a burner of a modulatable gas heating device, comprising
    at least a housing (1) with two controllable closure elements having spaced-apart axes which extend consecutively axially in a straight line in a gas flow direction between an inlet channel (2) and an outlet channel (4) of the housing, with both closure elements in a de-energized state independently of one another abruptly closing the gas control and safety valve with a corresponding associated spring element (7, 12),
    wherein the first closure element, which is also used to modulate a gas flow, comprises a throttle element (8) and spaced therefrom a first spring element (7),
    wherein the first closure element is driven by a spindle-nut-system coupled with an electric motor (15) having at least one field winding (16), and the second closure element comprises a sealing element (10) connected with an armature (9),
    wherein the armature (9) is arranged in a cylindrical cavity (18) so as to operate against a force of a second spring element (12) acting on the armature (9), and this cavity is surrounded by a field winding (17) of the armature (9) which is formed as part of an electromagnet, and the field winding (16) of the stepper motor (15) of the first closure element and the field winding (17) of the armature (9) of the second closure element are disposed in the gas flow closure element are disposed in the gas flow, and
    an ondular washer (6) disposed on a wall of the housing and in a sandwich structure between opposing end faces of the two closure elements for the purpose of compensating for axial tolerances as well as for ensuring an adequate pressing force of the two closure elements.

2. The gas control and safety valve according to claim 1, wherein the armature (9) is implemented as a hollow armature, where the hollow armature (9) is arranged in the cylindrical cavity (18) so as to operate against the force of the second spring element (12) disposed inside the hollow armature (9).

3. The gas control and safety valve according to claim 1, further comprising an inlet chamber (3) arranged downstream of the inlet channel (2) in the gas flow direction, wherein in the closed position of the gas control and safety valve a sealing surface (8.1) of the throttle element (8) seats gas-tight on a valve seat (13) arranged at the end of the inlet chamber (3), and a sealing surface (11) of the sealing element (10) seats gas-tight on a valve seat (14) disposed at the start of the outlet channel (4).

4. The gas control and safety valve according to claim 1, wherein the throttle element (8) is configured for axial movement inside the inlet chamber (3) between an open position and a closed position.

5. The gas control and safety valve according to claim 4, wherein the valve seat (13) and the sealing surface (8.1) of the throttle element (8) are each formed as a ring, wherein in the open position of the throttle element (8) an annular gap for the inflowing gas is formed between the valve seat (13) and the throttle element (8).

6. The gas control and safety valve according to claim 1, wherein the housing (1) is formed in two parts with a first housing part (1.1) and a second housing part (1.2), wherein the first closure element is disposed in the first housing part (1.1) and the second closure element is disposed in the second housing part (1.2).

7. The gas control and safety valve according to claim 1, wherein the spindle-nut system is arranged either inside the electric motor by using a drive axle (15.1) or outside the electric motor by using a motor shaft (15.2).

8. The gas control and safety valve according to claim 1, wherein the first closure element performs a control function for adapting the gas flow to a changing thermal load, whereas the second closure element is employed solely as a safety-shutoff device.

* * * * *